(12) United States Patent
Pilkington (10) Patent No.: US 8,566,828 B2
(45) Date of Patent: Oct. 22, 2013

(54) ACCELERATOR FOR MULTI-PROCESSING SYSTEM AND METHOD

(75) Inventor: Charles E. Pilkington, Ottawa (CA)

(73) Assignee: STMicroelectronics, Inc., Coppell, TX (US)

( * ) Notice: Subject to any disclaimer, the term of this patent is extended or adjusted under 35 U.S.C. 154(b) by 2296 days.

(21) Appl. No.: 10/967,059

(22) Filed: Oct. 15, 2004

(65) Prior Publication Data

US 2005/0149937 A1    Jul. 7, 2005

Related U.S. Application Data (60) Provisional application No. 60/531,502, filed on Dec. 19, 2003, provisional application No. 60/531,538, filed on Dec. 19, 2003.

(51) Int. Cl.
*G06F 9/46*    (2006.01)
*G06F 9/44*    (2006.01)

(52) U.S. Cl.
USPC ............ 718/102; 718/104; 718/108; 719/315

(58) Field of Classification Search
USPC ............ 718/1, 100, 101, 102, 103, 104, 105, 718/106, 107, 108
See application file for complete search history.

(56) References Cited

U.S. PATENT DOCUMENTS

| | | | |
|---|---|---|---|
| 4,084,228 A | | 4/1978 | Dufond et al. |
| 4,654,654 A | * | 3/1987 | Butler et al. .................. 370/463 |
| 4,796,178 A | * | 1/1989 | Jennings et al. .............. 718/103 |
| 5,057,996 A | * | 10/1991 | Cutler et al. .................. 718/106 |
| 5,202,987 A | | 4/1993 | Bayer et al. |
| 5,515,538 A | * | 5/1996 | Kleiman ........................ 710/260 |
| 5,659,750 A | * | 8/1997 | Priem et al. ................... 718/108 |
| 5,740,406 A | * | 4/1998 | Rosenthal et al. ............ 711/169 |
| 5,752,031 A | * | 5/1998 | Cutler et al. .................. 718/103 |
| 5,832,262 A | | 11/1998 | Johnson et al. |
| 5,901,315 A | * | 5/1999 | Edwards et al. .............. 717/124 |
| 5,905,883 A | * | 5/1999 | Kasuya .......................... 703/17 |
| 6,061,709 A | | 5/2000 | Bronte |
| 6,152,612 A | * | 11/2000 | Liao et al. ...................... 703/23 |

(Continued)

FOREIGN PATENT DOCUMENTS

EP    0 683 451 A2    11/1995

OTHER PUBLICATIONS

J. Kreuzinger et al., "Real-Time Event-Handling and Scheduling on a Multithreaded Java Microcontroller", Microprocessors and Microsystems 27 (2003) pp. 19-31.

(Continued)

*Primary Examiner* — Abdullah Al Kawsar
(74) *Attorney, Agent, or Firm* — Munck Wilson Mandala, LLP (57) ABSTRACT

A processing system includes a plurality of processors capable of executing a plurality of threads and supporting at least one of hardware context switching and software context switching. The processing system also includes a hardware concurrency engine coupled to the plurality of processors. The concurrency engine is capable of managing a plurality of concurrency primitives that coordinate execution of the threads by the processors. The concurrency primitives could represent objects, and the processors may be capable of using the objects by reading from and/or writing to addresses in an address space associated with the concurrency engine. Each address may encode an object index identifying one of the objects, an object type identifying a type associated with the identified object, and an operation type identifying a requested operation involving the identified object.

28 Claims, 4 Drawing Sheets

(56) References Cited

U.S. PATENT DOCUMENTS

| | | | |
|---|---|---|---|
| 6,260,057 B1 * | 7/2001 | Eykholt et al. | 718/102 |
| 6,505,229 B1 * | 1/2003 | Turner et al. | 718/107 |
| 6,952,825 B1 * | 10/2005 | Cockx et al. | 718/102 |
| 7,111,177 B1 * | 9/2006 | Chauvel et al. | 713/300 |
| 2001/0056456 A1 | 12/2001 | Cota-Robles | |
| 2002/0099756 A1 * | 7/2002 | Catthoor et al. | 709/102 |
| 2002/0120428 A1 * | 8/2002 | Christiaens | 702/186 |
| 2003/0093655 A1 * | 5/2003 | Gosior et al. | 712/228 |
| 2004/0006584 A1 | 1/2004 | Vandeweerd | |
| 2004/0216102 A1 * | 10/2004 | Floyd | 718/100 |
| 2005/0097552 A1 | 5/2005 | O'Connor et al. | |
| 2005/0149937 A1 | 7/2005 | Pilkington | |

OTHER PUBLICATIONS

Office Action dated Jun. 10, 2009 in connection with U.S. Appl. No. 10/967,013.

* cited by examiner

ACCELERATOR FOR MULTI-PROCESSING SYSTEM AND METHOD

CROSS REFERENCE TO RELATED APPLICATIONS

This patent application claims priority under 35 U.S.C. §119(e) to the following U.S. Provisional Patent Applications:
Ser. No. 60/531,502 filed on Dec. 19, 2003; and
Ser. No. 60/531,538 filed on Dec. 19, 2003;
which are hereby incorporated by reference.

This patent application is related to U.S. patent application Ser. No. 10/967,013 entitled "THREAD EXECUTION SCHEDULER FOR MULTI-PROCESSING SYSTEM AND METHOD" filed on Oct. 15, 2004, which is hereby incorporated by reference.

TECHNICAL FIELD

This disclosure is generally directed to processing systems and more specifically to an accelerator for multi-processing system and method.

BACKGROUND

Multi-processor computing systems are becoming more and more popular for use in applications that require large amounts of processing power. One type of multi-processor computing system is a symmetric multi-processing or "SMP" architecture. In an SMP architecture, multiple processors are used to perform tasks or processes in parallel. This allows, for example, the processors to execute different portions or "threads" of an application at the same time. Any available processor may be assigned to execute one or multiple threads. Also, additional processors may be added to improve the performance of the computer system and to execute additional threads.

In order to execute an application appropriately, the processors in conventional multi-processor computing systems need to be synchronized. A problem with conventional synchronization mechanisms is that the mechanisms are typically slow, which often reduces the performance of the multi-processor systems.

SUMMARY

This disclosure provides an accelerator for multi-processing system and method.

In a first embodiment, a processing system includes a plurality of processors capable of executing a plurality of threads and supporting at least one of hardware context switching and software context switching. The processing system also includes a hardware concurrency engine coupled to the plurality of processors. The concurrency engine is capable of managing a plurality of concurrency primitives that coordinate execution of the threads by the processors.

In particular embodiments, the concurrency primitives represent objects, and the processors are capable of using the objects by reading from and/or writing to addresses in an address space associated with the concurrency engine. Also, in particular embodiments, each address encodes an object index identifying one of the objects, an object type identifying a type associated with the identified object, and an operation type identifying a requested operation involving the identified object.

In a second embodiment, a method includes executing a plurality of threads using a plurality of processors. The method also includes managing a plurality of concurrency primitives that coordinate execution of the threads by the processors using a hardware concurrency engine.

In a third embodiment, a concurrency engine is capable of managing a plurality of concurrency primitives that coordinate execution of threads by a plurality of processors. The concurrency engine includes a command decoder capable of decoding requests from the processors, a command processor capable of executing operations associated with the decoded requests, and a response formatter capable of encoding results from the execution of the operations. The concurrency engine also includes a memory capable of storing information associated with a plurality of objects representing the concurrency primitives. Each operation executed by the command processor involves at least one of the objects. Each request from the processors includes at least one of a read operation and a write operation involving an address in an address space associated with the concurrency engine. The address encodes an identification of one of the objects and a requested operation.

In a fourth embodiment, an apparatus includes at least one of an input device and an interface to the input device. The input device is capable of providing input data. The apparatus also includes at least one of an output device and an interface to the output device. The output device is capable of receiving output data. The apparatus further includes a processing system capable of receiving the input data and generating the output data. The processing system includes a plurality of processors capable of executing a plurality of threads and a hardware concurrency engine coupled to the plurality of processors. The concurrency engine is capable of managing a plurality of concurrency primitives that coordinate execution of the threads by the processors.

In a fifth embodiment, a processor includes an instruction set supporting a plurality of instructions for execution and an embedded memory capable of storing instructions to be executed. The instructions to be executed implement at least one thread. The processor also includes a hardware concurrency engine capable of managing a plurality of concurrency primitives that coordinate execution of a plurality of threads by the processor and at least one additional processor.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
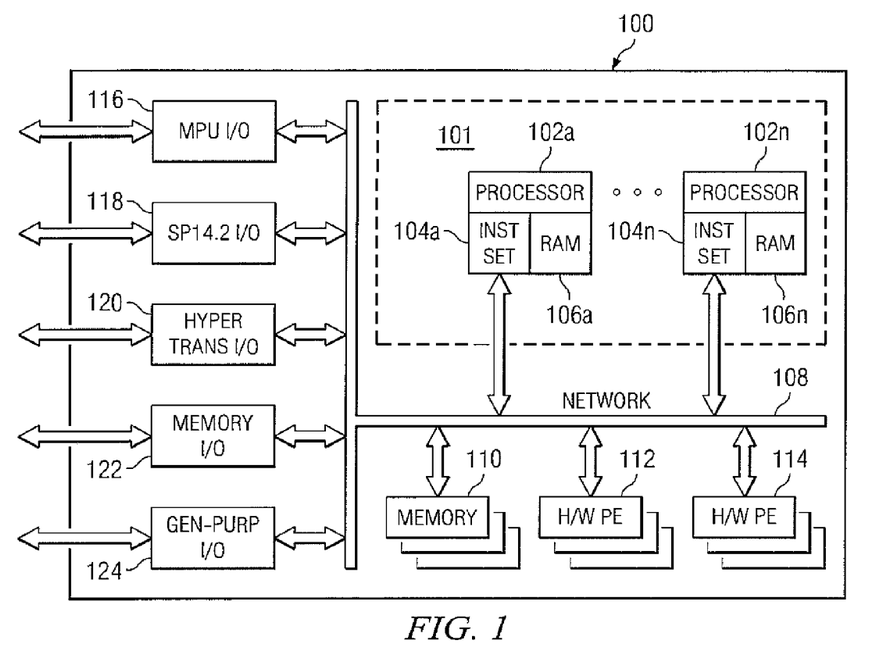
FIG. 1 illustrates an example processing system according to one embodiment of this disclosure.

FIG. 1 illustrates an example processing system 100 according to one embodiment of this disclosure. The embodiment of the processing system 100 shown in FIG. 1 is for illustration only. Other embodiments of the processing system 100 may be used without departing from the scope of this disclosure.

In this example embodiment, the processing system 100 includes a processor core 101 having multiple processors 102a-102n. The processors 102a-102n represent any suitable processing devices, such as reduced instruction set computer ("RISC") processors. As a particular example, the processors 102a-102n may represent multi-threaded processors having separate register banks for different threads. As another particular example, the processors 102a-102n may represent homogenous processors configured in a symmetric multi-processing ("SMP") arrangement.

In this example, the processors 102a-102n include customized instruction sets 104a-104n. Each of the customized instruction sets 104a-104n allows one of the processors 102a-102n to operate according to a particular set of instructions. For example, the customized instruction sets 104a-104n could be configured to allow the processors 102a-102n to operate in a particular environment. Each of the customized instruction sets 104a-104n could be implemented in any suitable manner, such as by using an application specific integrated circuit ("ASIC") implemented in one or more of the last metal layers of the processors 102a-102n. At least some of the customized instruction sets 104a-104n could represent the same instruction set, or all of the customized instruction sets 104a-104n could represent different instruction sets. In this document, the term "each" refers to every of at least a subset of the identified items.

The processors 102a-102n also include one or more embedded memories, such as random access memories ("RAM") 106a-106n. The random access memories 106a-106n are used to store any suitable information used by the processors 102a-102n, such as data and instructions executed by the processors 102a-102n. Each of the random access memories 106a-106n could represent any suitable amount of memory. Also, other types of embedded memories, such as read only memories ("ROM"), could be used in the processors 102a-102n.

In the illustrated embodiment, the processors 102a-102n are coupled to a network 108. In this document, the term "couple" and its derivatives refer to any direct or indirect communication between two or more elements, whether or not those elements are in physical contact with one another. The network 108 facilitates communication of information between various components of the processing system 100. For example, the network 108 allows the processors 102a-102n to retrieve instructions to be executed by the processors 102a-102n and data to be used during execution of the instructions. In some embodiments, the processing system 100 represents a "system on a chip" ("SoC"), and the network 108 represents a "network on a chip" ("NoC").

In this example, the network 108 is coupled to one or more memories 110, one or more hardware processing engines ("PE") 112, and one or more additional hardware processing engines 114. The memory 110 represents one or more memories capable of storing information used by the processing system 100. The memory 110 could represent a single type of memory or multiple types of memory, such as random access memory, read only memory, flash memory, programmable read only memory, and/or other or additional types of memory.

The hardware processing engines 112, 114 represent programmable hardware that may be customized according to particular needs. For example, the hardware processing engines 112, 114 may be programmed for use in particular applications or particular environments. The hardware processing engines 112, 114 could be programmed to perform any of a wide variety of functions. The hardware processing engines 112, 114 represent any suitable structures capable of providing customized or programmable functionality. As particular examples, the hardware processing engine 112 could be implemented using ASICs or Sea of Gates ("SoG") structures, and the hardware processing engine 114 could be implemented using field programmable gate arrays ("FPGA"). While FIG. 1 illustrates the use of both hardware processing engines 112 and 114, any number of different types of hardware processing engines (including a single type) could be used in the processing system 100.

In the illustrated example, the network 108 is also coupled to multiple interfaces 116-124. The interfaces 116-124 allow the processing system 100 to communicate with various external devices, such as external memories or peripheral devices. As shown in FIG. 1, a micro-processing unit ("MPU") interface 116 facilitates communication with an external micro-processing unit. A System Packet Interface Level 4, Phase 2 ("SPI4.2") interface 118 allows the processing system 100 to communicate using multiple communication protocols and variable data rates through a common system-level interface standard. A hyper transport interface 120 facilitates high bandwidth, chip-to-chip communications. A memory interface 122 allows communication with an external memory, such as a quad data rate ("QDR") memory. A general-purpose interface 124 allows other communications to and from the processing system 100. These represent some of the interfaces that may be used in the processing system 100. Other or additional interfaces, such as an interface to a co-processor or an application-specific interface, could also be used in the processing system 100.

The various components in the processing system 100 may communicate over the network 108 using any suitable protocol or protocols. In some embodiments, the components in the processing system 100 communicate with the network 108 using a standardized protocol. As a particular example, hardware wrappers may be used to convert between an internal data format used by the hardware processing engines 112, 114 or other components and a packet-oriented format used by the network 108.

In one aspect of operation, the processors 102a-102n in the processor core 101 are coordinated using various concurrency primitives. The concurrency primitives include structures such as monitors, conditions, semaphores, priority queues, and counters. The processor core 101 implements an accelerator in hardware that accelerates the use of the concurrency primitives. This allows the processor core 101 to more effectively perform coordination. This may be particularly useful in certain embodiments, such as when the processors 102a-102n represent homogenous processors arranged in an SMP configuration. Through the use of the hardware accelerator in the processor core 101, the performance of the processor core 101 may increase.

In another aspect of operation, at least some of the processors 102a-102n in the processor core 101 are capable of executing multiple threads, such as when at least one of the processors 102a-102n is capable of hardware multithreading. The threads represent portions of one or more applications, where the portions are capable of being executed in parallel. The processor core 101 implements at least one scheduler in hardware that schedules the execution of the threads by the processors 102a-102n. This may allow the processor core 101 to more efficiently schedule execution of the threads, which may also help to increase the performance of the processor core 101.

While this document may describe a processing system 100 that implements both acceleration of concurrency primitives and scheduling of thread execution, only one of these features could be implemented in a processing system. For example, a processing system could implement only the acceleration of concurrency primitives without implementing the thread scheduling mechanism described in more detail below. Similarly, a processing system could implement only the scheduling of thread execution without implementing the concurrency primitive acceleration mechanism described in more detail below.

Although FIG. 1 illustrates one example of a processing system 100, various changes may be made to FIG. 1. For example, the processing system 100 could include any number and type of processors and any number and type of hardware processing engines. The processing system 100 could also include any number and type of interfaces to external devices. In addition, while the processing system 100 has been described as possibly representing a "system on a chip," the processing system 100 could be implemented using any suitable number of chips or other structures.

Figure 2:
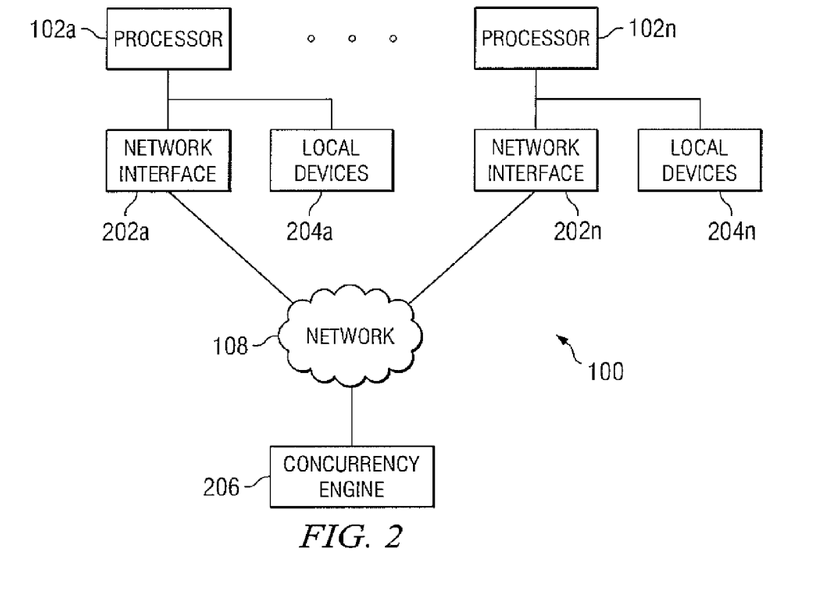
FIG. 2 illustrates additional details of an example processing system according to one embodiment of this disclosure.

FIG. 2 illustrates additional details of an example processing system 100 according to one embodiment of this disclosure. The embodiment of the processing system 100 shown in FIG. 2 is for illustration only. Other embodiments of the processing system 100 may be used without departing from the scope of this disclosure.

As shown in FIG. 2, the processing system 100 includes the processors 102a-102n, which are coupled to network interfaces 202a-202n. The network interfaces 202a-202n facilitate communication between the processors 102a-102n and a network, such as the network 108. The network interfaces 202a-202n may include any suitable interface for communicating over a network.

The processors 102a-102n are also coupled to other local devices 204a-204n. The other local devices 204a-204n represent any suitable devices that may be integrated into the processing system 100 and used by the processors 102a-102n. For example, the other local devices 204a-204n could represent co-processors or hardware accelerators. The other local devices 204a-204n could also represent memories, such as internal caches, or any other or additional devices.

In the illustrated example, the processors 102a-102n communicate with a concurrency engine 206 through the network interfaces 202a-202n and the network 108. The concurrency engine 206 represents a hardware device used to accelerate the use of concurrency primitives, which coordinate the operation of the processors 102a-102n. For example, the concurrency engine 206 may perform concurrency operations that implement and manage the use of semaphores, priority queues, counters, timers, monitors, and associated condition variables. The concurrency engine 206 may also support the scheduling of the execution of various threads by the processors 102a-102n. The concurrency engine 206 could represent any device capable of supporting the use of concurrency primitives. As a particular example, the processing system 100 could represent a system on a chip, and the concurrency engine 206 could represent a device in a region of a 32-bit or 64-bit address space.

In some embodiments, the concurrency engine 206 implements a number of concurrency "objects." These objects support the various coordination functions performed by the concurrency engine 206. Various techniques may be common or generic in handling the concurrency objects, such as methods for creating an object, deleting an object, and calling an object method.

The various functions performed by the concurrency engine 206 may be implemented in any suitable manner. For example, in a 32-bit address space with a 32-bit word size, the concurrency engine 206 could be mapped into a 24-bit or 16 megabyte region. Reading from or writing to locations in this space performs concurrency operations. Also, each of the concurrency objects may have two associated 32-bit values (denoted val1 and val2), which are used to implement the functionality of the concurrency operation associated with an object. In other embodiments, the functions performed by the concurrency engine 206 could be invoked using special concurrency control instructions defined in the instruction set architecture of the processors 102a-102n.

In particular embodiments, the address of a location in the address space of the concurrency engine 206 encodes an object index, an object type, and an operation type for a particular concurrency operation. For example, bits 2:4 in the address could encode an operation type, bits 5:7 in the address could encode an object type, and bits 8:23 in the address could encode an object index. The operation type identifies the concurrency operation desired, the object type identifies the type of concurrency object (counter, timer, semaphore, etc.) associated with the desired operation, and the object index identifies a particular concurrency object.

Different types of objects are encoded using bits 5:7 of the address. One example of the encodings for the object types in bits 5:7 is shown in Table 1.

TABLE 1

| Example Object Type Encoding | Object Type |
| --- | --- |
| 0 | Counting semaphore |
| 1 | Monitor |
| 2 | Normal condition |
| 3 | Deferred condition |
| 4 | Timeout condition |
| 5 | Priority Queue |
| 6 | Timer |
| 7 | Counter |

The operation type is encoded using bits 2:4 of an address. The operation type for a particular object depends on the object type. In particular embodiments, the values val1 and val2 for a specific object are accessed using an operation type of six or seven, respectively. It should be understood that other encodings and/or mechanisms for accessing the concurrency engine 206 may be used.

A generic scheme for creating and deleting objects could be implemented as follows. One of the processors 102a-102n reads from an address with an object index of zero (address bits 8:23 are zero), bits 5:7 indicating the type of concurrency object requested (semaphore, counter, etc.), and an operation type of zero (bits 2:4 are zero). The concurrency engine 206 then returns a value with bits 8:23 encoding either the object index of the newly created object or a value of zero if the object could not be created for some reason. To free an object, one of the processors 102a-102n could write a 32-bit value with bits 8:23 indicating the object index, bits 5:7 encoding the object type, and bits 2:4 encoding a value of zero.

In some embodiments, high-use concurrency operations are implemented by a single read or write operation to a location in the concurrency engine address space. However, operations that involve multiple transactions could also be supported. Operations performed with a single read or write may be performed atomically. As a result, these operations are performed for a thread on one of the processors 102a-102n without concern that operations from other threads could corrupt object data structures in mid-operation. Operations that involve multiple transactions (such as multiple reads and/or writes) may be performed by locking a concurrency object, performing the operations, and unlocking the object. In particular embodiments, an object may be locked by reading with an operation type of zero and unlocked by writing with an operation type of zero. This encoding does not collide with the object creation and deletion encoding described above because the object identifier is non-zero for a lock/unlock operation. If multiple threads attempt to lock the same object, the concurrency engine 206 may stall one, some, or all of these threads so that only one thread at a time can execute while the object is locked.

At least some of the concurrency objects have an associated wait queue that identifies any threads waiting for some kind of state change in an object. For example, multiple threads may be attempting to lock and use an object. One thread is allowed to execute while the others are placed in the wait queue. Once the first thread unlocks the object, another thread from the wait queue is allowed to use the object.

If there are multiple threads in a wait queue, the concurrency engine 206 often needs to determine which one of the waiting threads should be woken up and allowed to resume execution. Several techniques may be used by the concurrency engine 206 to select one of the multiple threads. For example, the concurrency engine 206 could use round robin ordering, a first-in first-out (FIFO) ordering where the thread that has been waiting the longest is serviced first, an ordering based on static priority, and an ordering based on dynamically-calculated priority. In the static and dynamic ordering schemes, FIFO ordering may be used if multiple threads have the same priority.

The following describes several examples of the various functions supported by the concurrency engine 206. This represents one specific implementation of the concurrency engine 206. Any number of modifications may be made to the concurrency engine 206 described below according to particular needs.

As described above, the concurrency engine 206 may support the scheduling of the execution of various threads by the processors 102a-102n. The concurrency engine 206 facilitates the scheduling of thread execution by suspending and resuming execution of the threads. The concurrency engine 206 executes various functions to support the suspension and resumption of the threads. For example, the concurrency engine 206 supports the stalling of read or write acknowledgements, which are generated and provided to the processors 102a-102n after successful read or write operations. If the network 108 supports split-transactions, a read or a write operation may require a separate response before one of the processors 102a-102n continues execution. The concurrency engine 206 uses this mechanism to suspend execution by one of the processors 102a-102n by delaying the response to a read or write operation requested by that processor until the executing thread is allowed to continue.

The concurrency engine 206 also supports interrupts and/or exceptions. One of the processors 102a-102n may request permission for an operation by reading or writing to the address space of the concurrency engine 206. If the operation is allowed, the concurrency engine 206 allows the transaction to complete normally. If the operation should be delayed (such as to enforce SMP execution semantics), the concurrency engine 206 issues an interrupt or exception, which causes that processor to save its state and switch to another thread.

The concurrency engine 206 could further have direct hardware access to logic in the processors 102a-102n. The concurrency engine 206 may use this access to perform any of a wide variety of functions. For example, the concurrency engine 208 could enable or disable processor execution or increase power or clock speed for higher priority processes. The concurrency engine 208 could also gate or alter a clock signal of at least one of the processors 102a-102n. The concurrency engine 208 could further provide control signals to a thread scheduler (described in more detail below) in at least one of the processors 102a-102n. In addition, the concurrency engine 208 could provide control signals to load/store logic in at least one of the processors 102a-102n, where the load/store logic performs the read and write operations.

While this represents several possible ways that the concurrency engine 206 facilitates the scheduling of thread execution, the concurrency engine 206 could use any other or additional approaches or a combination of approaches. For example, the concurrency engine 206 may initially stall a thread executed on one of the processors 102a-102n by delaying a read or write acknowledgement. If the concurrency engine 206 later determines the processor could be doing other useful work, the concurrency engine 206 could provide an interrupt or exception.

As described above, the concurrency engine 206 may also implement and manage the use of objects providing semaphores, priority queues, counters, timers, monitors, and associated condition variables.

The concurrency engine 206 supports the use of counter objects to implement counters in the processing system 100. A counter could represent a 64-bit value. The 32 lower-order bits of the counter value are stored in val1, and the 32 higher-order bits are stored in val2. Increments and decrements are performed on the 64-bit value. Read and write operations involving the lower-order bits of the counter value may be performed using an operation type of six (encoded in bits 2:4), and the higher-order bits of the counter value may be directly accessed using an operation type of seven. Table 2 gives additional example operation types for a counter object and their associated semantics, assuming a 32 bit architecture.

TABLE 2

| Operation Type (encoding of bits 2:4) | Associated Action on Read | Associated Action on Write of Value N |
|---|---|---|
| 1 | Return the current 32 low-order bits. | Set the 32 low-order bits of the counter to N, and clear the 32 high-order bits. |
| 2 | Increment the current value, and return the 32 low-order bits of the new result. | Add N to the current value. |
| 3 | Decrement the current value, and return the 32 low-order bits of the new result. | Subtract N from the current value. |

The concurrency engine 206 also supports the use of counting semaphore objects. The value of a semaphore is held in val1, which is interpreted as a 32-bit unsigned integer. In some embodiments, the concurrency engine 206 may use val2 to encode operational variants, such as an ordering scheme for the object's wait queue. In particular embodiments, the concurrency engine 206 places threads waiting to acquire a semaphore in a FIFO wait queue, a wait queue ordered based on request priority or an application-specific ordering, or other type of wait queue. The thread at the head of the wait queue is allowed to resume execution when the value val1 is greater than or equal to the number of units the thread is requesting. Table 3 gives example operation types for a counting semaphore object and their associated semantics.

TABLE 3

| Operation Type (encoding of bits 2:4) | Associated Action on Read | Associated Action on Write of Value N |
|---|---|---|
| 1 | Acquire one unit of the semaphore. Return the number of units remaining. Stall the caller if the semaphore is currently zero. | Acquire N units of the semaphore. Stall the caller if the current value of the semaphore is less than N. |
| 2 | Release one unit of the semaphore. Return the 32 low-order bits of the new result. Wake up any threads that have stalled due to an acquire operation. | Release N units of semaphore. Wake up any threads that have stalled due to an acquire operation. |

The term "caller" in Table 3 and in the following description refers to the thread that is performing the read or write access to the concurrency engine 206.

The concurrency engine 206 further supports the use of monitor objects. A thread identifier identifying an owner of a monitor object is held in val1. In some embodiments, a value of −1 for val1 indicates that the monitor object is free. Also, the concurrency engine 206 may use val2 to encode operational variants, such as an ordering scheme for the wait queue. If the monitor object is occupied (val1 not equal to −1), a thread trying to enter the monitor is placed in the wait queue. When the monitor object becomes free, the concurrency engine 206 selects the next thread in the queue to enter the monitor object based on the thread ordering scheme for the queue. Table 4 gives example operation types for a monitor object and their associated semantics.

TABLE 4

| Operation Type (encoding of bits 2:4) | Associated Action on Read | Associated Action on Write of Value N |
|---|---|---|
| 1 | Enter the monitor. This will stall the caller until the monitor is free, and then enter the monitor. | Exit the monitor. |
| 2 | Try to enter the monitor. This will return 1 if the entry was successful and 0 if the entry failed. This call is non-blocking. | Exit the monitor. |
| 3 | Check the ownership of the monitor. This will return 1 if the caller is already in the monitor and 0 otherwise. | Exit the monitor. |

Some embodiments the concurrency engine 206 may be capable of dynamically increasing the priority $P_o$ of the thread currently owning the monitor to $P_{emax}$, where $P_{emax}$ is the maximum priority of threads on the monitor entry list. The priority of the owner thread would be returned to the original value once it releases the monitor. This mechanism is a hardware solution to the priority inversion problem associated with monitors.

The concurrency engine 206 also supports the use of condition objects. Conditions are associated with a monitor object. The index of a monitor object is held in val1. Conditions also have an associated wait queue. In some embodiments, the concurrency engine 206 may use val2 to encode operational variants, such as an ordering scheme for the wait queue. When a thread suspends execution by waiting on a condition, the associated monitor data structures are updated to indicate the caller thread is no longer using the monitor object. If other threads are waiting to enter the associated monitor, one is selected using the thread-ordering scheme in effect for that monitor, and execution is resumed for that thread. The monitor data structures are updated to indicate this thread is now the owner of the monitor. The concurrency engine 206 may choose to deliver a memory access exception to the calling thread if it tries to perform a wait or signal operation on a condition and that thread is not the current owner of the associated monitor. Table 5 gives example operation types for a condition object and their associated semantics.

TABLE 5

| Operation Type (encoding of bits 2:4) | Associated Action on Read | Associated Action on Write of Value N |
|---|---|---|
| 1 | Wait on the condition. Suspend the caller. Put the caller on the wait queue associated with the condition. If one or more threads are on the monitor wait queue, select one using the ordering mechanism in effect for the monitor. Resume execution of the selected thread, and update concurrency engine state to reflect the new monitor owner. | Signal the condition. If the wait queue associated with the condition is empty, this has no effect. Otherwise, the caller is put in the associated monitor's wait queue and suspended. A thread is taken off the condition wait queue and marked as owning the monitor, and execution resumes for this thread. |
| 2 | Same as read with OP equal to 1. | Signal N operation. Same as write with OP of 1, with the following exceptions. If N is 0, this is a no-operation. If N is 1, this is the same as write operation with OP of 1. If N > 0, up to N-1 threads are taken from the wait queue and placed in the monitor wait queue. If N is −1, all remaining threads on the condition wait queue are placed in the monitor wait queue. |

The concurrency engine 206 further supports the use of deferred condition objects. Deferred conditions are associated with a monitor object. The index of the monitor object is held in val1. Deferred conditions also have an associated wait queue. In some embodiments, the concurrency engine 206 may use val2 to encode operational variants, such as an ordering scheme for the wait queue. A deferred condition is similar to a normal condition except that the signal operation does not immediately remove the caller from the monitor object. Instead, the deferred condition puts any signaled threads in the monitor wait queue. The concurrency engine 206 may deliver a memory access exception to a calling thread if it tries to perform a wait or signal operation on a condition and it is not the current owner of the associated monitor object. Table 6 gives example operation types for a deferred condition object and their associated semantics.

TABLE 6

| Operation Type (encoding of bits 2:4) | Associated Action on Read | Associated Action on Write of Value N |
|---|---|---|
| 1 | Wait on the condition. Suspend the caller. Put the caller in the wait queue associated with the condition. Resume execution of any thread trying to enter the associated monitor. | Signal the condition. If the wait queue associated with the condition is empty, this has no effect. Otherwise, a thread is taken off the condition wait queue and placed in the monitor wait queue. |
| 2 | Same as read with OP equal to 1. | Signal N operation. Same as write with OP of 1, with the following exceptions. If N is 0, this is a no-operation. If N > 0, up to N threads are taken from the wait queue and placed in the monitor wait queue. If N is −1, all remaining threads on the condition wait queue are placed in the monitor wait queue. |

Beyond that, the concurrency engine 206 supports the use of timeout condition objects. Timeout conditions are associated with a monitor object. The index of the monitor object is held in val1. Timeout conditions also have an associated wait queue. In some embodiments, the concurrency engine 206 may use val2 to encode operational variants, such as an ordering scheme for the wait queue. When a thread suspends execution by waiting on a condition, the associated monitor data structures are updated to indicate the caller thread is no longer using the monitor object. If other threads are waiting to enter the associated monitor, one is selected using the thread-ordering scheme in effect for that monitor object, and execution is resumed for the selected thread. The monitor data structures are updated to indicate the selected thread is now the owner of the monitor object. A timeout condition is the same as a deferred condition except that a numerical timeout value of N is given when a thread waits on a condition. If the thread is not signaled at the end of N time units, the concurrency engine 206 automatically allows the thread to use the monitor object if the monitor object is empty. Otherwise, the thread is placed in the monitor wait queue. The concurrency engine 206 may choose to deliver a memory access exception to a calling thread if it tries to perform a wait or signal operation on a condition and it is not the current owner of the associated monitor. Table 7 gives example operation types for a timeout condition object and their associated semantics.

TABLE 7

| Operation Type (encoding of bits 2:4) | Associated Action on Read | Associated Action on Write of Value N |
|---|---|---|
| 1 | No operation. | Wait on the condition. Suspend the caller. Put the caller in the wait queue associated with the condition. Associate a timeout value N with the caller. Resume execution of any thread trying to enter the associated monitor. |
| 2 | No operation. | Signal the condition. If the wait queue associated with the condition is empty, this has no effect. Otherwise, a thread is taken off the condition wait queue and placed in the monitor wait queue. |
| 3 | No operation. | Signal N operation. Same as write with OP of 1, with the following exceptions. If N is 0, this is a no-operation. If N > 1, up to N threads are taken from the wait queue and placed in the monitor wait queue. If N is −1, all remaining threads on the condition wait queue are placed in the monitor wait queue. |

In addition, the concurrency engine 206 supports the use of priority queue objects. The number of items in the queue is held in val1, which may be interpreted as a 32-bit unsigned integer. A wait queue is associated with each priority queue object and is used for threads waiting to obtain values from the queue. In some embodiments, the concurrency engine 206 may use val2 to encode operational variants, such as an ordering scheme for the wait queue.

While the encoding of entries in a priority queue may be implementation specific, the following serves as an example. Entries in the priority queue could represent 32-bit values, where the eight bits in locations 0:7 may encode a priority value, the eleven bits in locations 8:18 may encode a numerical value N, and the thirteen bits in locations 19:31 may indicate a work identifier. A priority queue containing 32-bit values may be ordered based on the encoded priority value with higher priority values at the head of the queue. When a thread performs a read operation to obtain the highest priority entry in the queue, the 32-bit value at the head of the queue is returned to the caller, and the N field is decremented. When N reaches zero, the entry value is removed or popped from the head of the queue. The work identifier is available to an application for encoding work descriptors or some other application-specific purposes.

When threads are on the wait queue associated with the priority queue and the priority queue is non-empty, a decision is made as to what thread to wake up to perform the work. In some embodiments, the concurrency engine 206 uses a FIFO queue or other type of queue. In other embodiments, the concurrency engine 206 selects a thread running on a processor that is the least lightly loaded or that has a performance suitable for the work priority. The concurrency engine 206 could also use an application-specific ordering scheme. Table 8 gives example operation types for a priority queue object and their associated semantics.

TABLE 8

| Operation Type (encoding of bits 2:4) | Associated Action on Read | Associated Action on Write of Value N |
|---|---|---|
| 1 | Queue read. Acquire a 32-bit value from the priority queue. Encoding of value obtained is as described above. Stall the caller if no items are currently in the queue. | Queue push. Insert a 32-bit value in the priority queue. Encode as described above. Wake up any threads stalled in a queue pop operation. |

Furthermore, the concurrency engine 206 could also maintain thread descriptors, also referred to as "fork descriptors." Thread descriptors could include, but are not limited to, a stack pointer, a stack size, a pointer to a function that the thread is to execute initially, arguments to the function, the number N of threads that have been requested to execute the function, an index I ($0<=I<N$) that corresponds to the position of the caller in the initial fork, the priority of initial execution, the status of children threads, return values of children threads, the number of children threads, and thread descriptor identifiers or process identifiers (PID) of the caller's parent.

Various ways of representing the thread descriptors in the concurrency engine 206 are possible. In some embodiments, a special address range for the thread descriptor for the caller thread (the "self" thread descriptor) and another address range for the thread descriptors for the caller's children (the child thread descriptor) are used. The various entries in the thread descriptors could then be placed at locations within these address ranges. An additional address range could map the descriptors for each thread or process identifier.

In addition, accesses to various locations in the thread descriptor address ranges of the concurrency engine 206 could have additional mechanisms to enforce the semantics of thread trees. For example, writing a control value to a location in a child thread descriptor could start, or fork, children threads. The children threads could be inserted in a parent/child thread tree, or they could be executed as orphans with no parent in the thread tree. The children threads may have a self thread descriptor that is a copy of the parent's child thread descriptor with a few updated fields (such as the index I, where $0<=I<N$, indicating the number of the thread in the original parent fork request). Writing a value V to a location in the self descriptor could indicate to the parent thread that the self thread has finished execution and return the status value V. Reading a location could have the effect of waiting for either one, some, or all children to terminate execution.

The concurrency engine 206 could support any of a wide variety of additional semantics in the processing system 100. For example, the concurrency engine 206 could enforce semantics when managing the concurrency primitives. The semantics could be associated with mutual exclusion, waiting and signaling conditions, timeout conditions, deferred conditions, priority inheritance in monitors to avoid priority inversion, priority queues, and operation ordering.

Using the various objects described above, the concurrency engine 206 allows the processors 102a-102n to execute multi-threaded applications more efficiently. In particular, the objects implement various primitives and allow the concurrency engine 206 to act as a hardware operating system. In some embodiments, the processors 102a-102n are arranged in an SMP configuration, and the concurrency engine 206 helps to greatly increase the SMP performance of the processing system 100.

The concurrency engine 206 represents any suitable hardware device(s) to implement at least some of the features described above. For example, the concurrency engine 206 could be implemented using a Sea of Gates structures, an ASIC structure, an FPGA structure, or other suitable hardware. One embodiment of the concurrency engine 206 is shown in FIG. 3, which is described below.

Although FIG. 2 illustrates additional details of one example of a processing system 100, various changes may be made to FIG. 2. For example, the processing system 100 could include any number of processors 102a-102n. Also, the concurrency engine 206 could be coupled directly to the processors 102a-102n or implemented in one of the processors 102a-102n.

Figure 3:
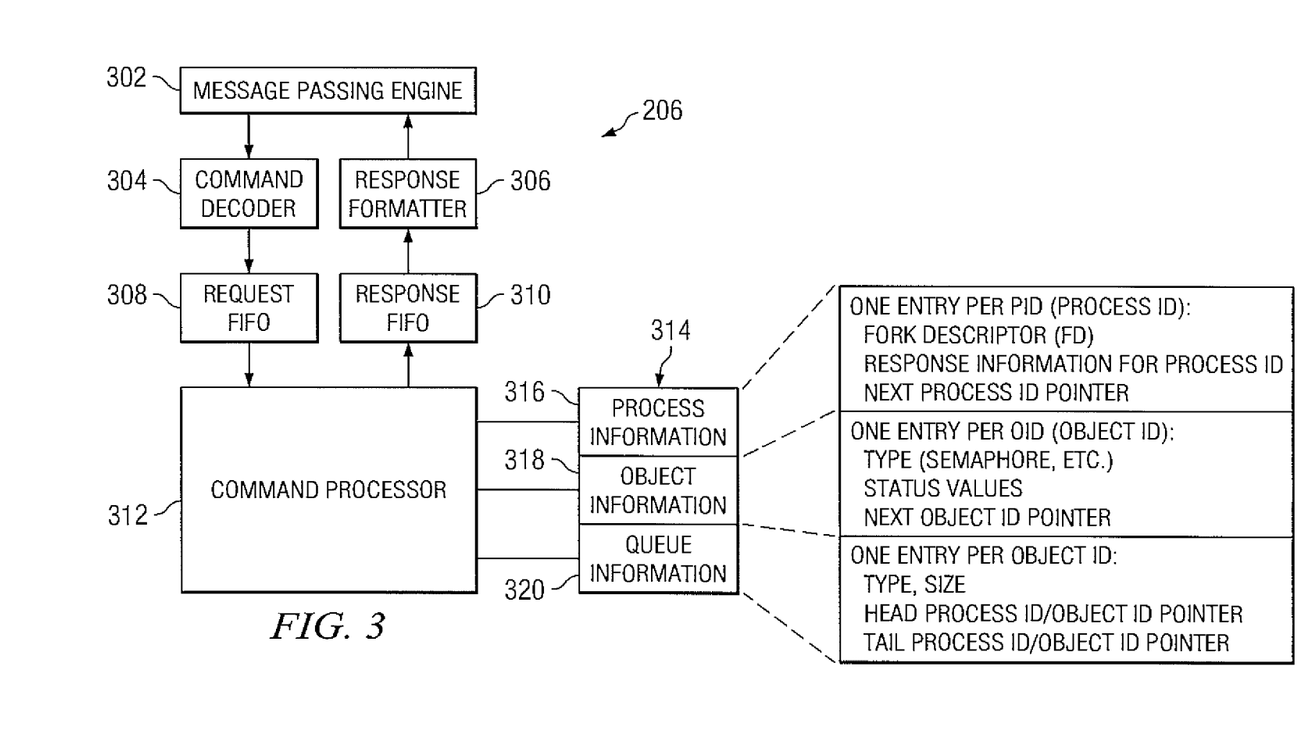
FIG. 3 illustrates an example concurrency engine for accelerating multi-processing in a processing system according to one embodiment of this disclosure.

FIG. 3 illustrates an example concurrency engine 206 for accelerating multi-processing in a processing system according to one embodiment of this disclosure. The embodiment of the concurrency engine 206 shown in FIG. 3 is for illustration only. Other embodiments of the concurrency engine 206 may be used without departing from the scope of this disclosure. Also, for ease of explanation, the concurrency engine 206 is described as operating in the processor core 101 of FIG. 2. The concurrency engine 206 may be used in any other suitable environment.

In the illustrated example, the concurrency engine 206 includes a message passing engine 302. The message passing engine 302 represents an interface to the network 108. For example, the message passing engine 302 allows the concurrency engine 206 to receive requests from the processors 102a-102n and to provide responses to the processors 102a-102n. The message passing engine 302 represents any suitable interface to the network 108. As an example, the message passing engine 302 may represent a read/write interface operating in slave mode.

A command decoder 304 and a response formatter 306 are coupled to the message passing engine 302. The command decoder 304 decodes requests received by the concurrency engine 206 so that requested operations may be performed by the concurrency engine 206. For example, the command decoder 304 may decode the object index, the object type, and the operation type for a requested concurrency operation. The command decoder 304 then provides this information for execution by the concurrency engine 206. The response formatter 306 receives the results from the execution of the operations and formats the results for communication to one or more of the processors 102a-102n. For example, the response formatter 306 may receive results from the execution of a concurrency operation, and the response formatter 306 may encode the results in any suitable format for communication over the network 108.

A request queue 308 and a response queue 310 are coupled to the command decoder 304 and the response formatter 306, respectively. The request queue 308 temporarily stores decoded requests until the requested operations may be performed. The response queue 310 temporarily stores the results of the executed operations until the results may be retrieved and encoded by the response formatter 306.

A command processor 312 is coupled to the request queue 308 and the response queue 310. The command processor 312 is capable of performing requested concurrency operations and providing the results from the execution. For example, the command processor 312 could update the values contained in timer objects, semaphore objects, queue objects, counter objects, monitor objects, and condition objects. The command processor 312 could also retrieve and provide the values contained in these objects. In addition, the command processor 312 could schedule the execution of the threads by the various processors 102a-102n in the processing system 100. As particular examples, the command processor 312 could execute the various functions described above with respect to FIG. 2.

A memory 314 is coupled to the command processor 312. The memory 314 stores various information used by the command processor 312 to perform the concurrency operations. In this example, the memory 316 is subdivided into three different sections 316-320. A process information section 316 stores the thread descriptors for the various threads being executed by the processors 102a-102n as described above.

An object information section 318 stores information about the various concurrency objects used to implement the concurrency operations. For example, the concurrency objects could include the timer objects, semaphore objects, queue objects, counter objects, monitor objects, and condition objects described above. Each object may have a unique object identifier ("OID"), and the object information section 318 may contain an entry for each of these object identifiers. For each object identifier, the associated entry could include information such as the object type, one or more status values, and a pointer. The object type identifies whether the associated object is a counter, semaphore, timer, or other type of object. The status value(s) represent the values associated with the object, such as the val1 and val2 values described above. The pointer identifies the next object identifier entry in the object information section 318.

A queue information section 320 represents the various wait queues described above. These wait queues are used to queue requests for each of the concurrency objects. For example, each concurrency object may have an associated wait queue identifying the various threads that wish to access and use that concurrency object, and the queue information section 320 may contain an entry for the each object's wait queue. For each entry, the queue information section 320 includes queue information, a head pointer, and a tail pointer. The queue information identifies the type of queue (FIFO, etc.) and the size (number of entries) currently in the wait queue. The head and tail pointers point to the beginning and end of a linked list that identified the threads waiting on a particular concurrency object.

In some embodiments, all of the various components shown in FIG. 3 may be implemented in hardware. For example, the components could be implemented using Sea of Gates structures. Also, the memory 314 may represent any suitable amount of memory. The amount of memory 314 could, for example, be based on the expected number of process identifiers, the expected number of object identifiers, and the size of the fork descriptors in a particular processing system 100.

Although FIG. 3 illustrates one example of a concurrency engine 206 for accelerating multi-processing in a processing system, various changes may be made to FIG. 3. For example, while FIG. 3 illustrates the memory 314 as a single memory structure, the memory 314 could also represent any number of separate memories. Also, the functional division of FIG. 3 is for illustration only. Various components in FIG. 3 may be combined or omitted and additional components may be added according to particular needs.

Figure 4A:
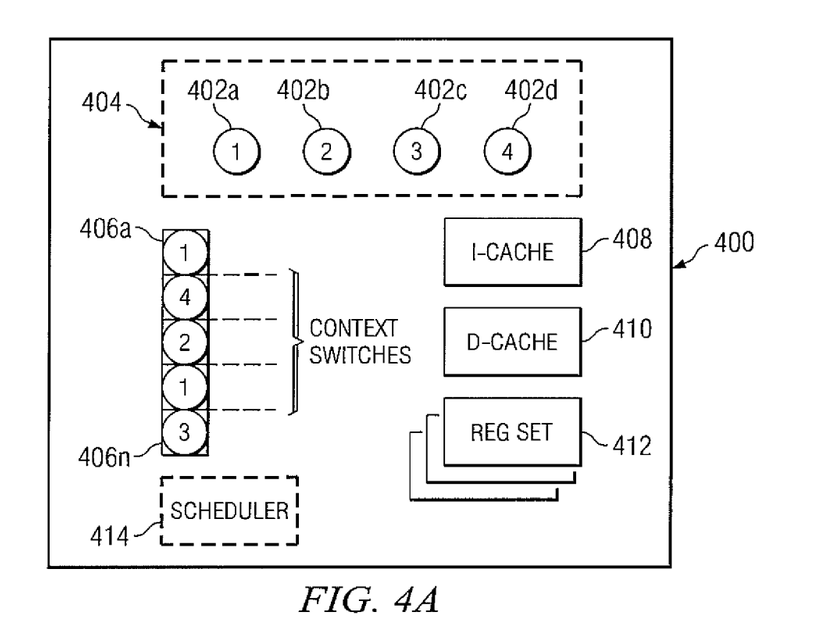
FIGS. 4A and 4B illustrate example scheduling in a multi-threaded processor according to one embodiment of this disclosure.
Figure 4B:
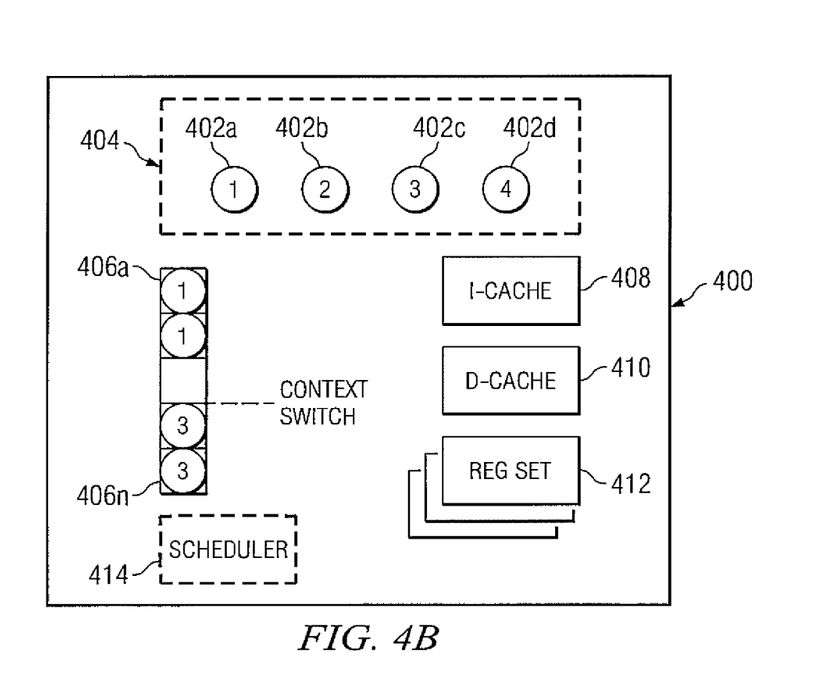

FIGS. 4A and 4B illustrate example scheduling in a multi-threaded processor according to one embodiment of this disclosure. In particular, FIG. 4A illustrates a multi-threaded processor 400 that interleaves threads on a cycle-by-cycle basis, and FIG. 4B illustrates the multi-threaded processor 400 interleaving threads in blocks. The multi-threaded processor 400 could, for example, be used as at least one of the processors 102a-102n in the processing system 100 of FIG. 1. The multi-threaded processor shown in FIGS. 4A and 4B is for illustration only. Other embodiments of the multi-threaded processor may be used without departing from the scope of this disclosure.

As shown in FIG. 4A, the multi-threaded processor 400 includes multiple threads 402a-402d. The threads 402a-402d represent portions of one or more applications that are capable of being executed at the same time by the multi-threaded processor 400. The states for threads 402a-402d shown in FIG. 4A could be stored in any suitable medium, such as a random access memory 404. In this example, the multi-threaded processor 400 includes four threads, although any suitable number of threads may be used.

In this embodiment, the multi-threaded processor 400 represents a pipelined processor that includes a pipeline having multiple stages 406a-406n. Collectively, the stages 406a-406n of the processor 400 are capable of performing the required functions to execute instructions that form the threads 402a-402d. Individually, each of the stages 406a-406n performs one of the functions needed to execute the instructions. For example, the stages 406a-406n may include an address generation stage, an instruction fetch stage, a decode stage, a read stage, an execution stage, and a write or write-back stage.

In addition, the processor 400 may have an instruction cache ("I-CACHE") 408, a data cache ("D-CACHE") 410, and a register set ("REG SET") 412. The instruction cache 408 stores program instructions for execution by the stages 406a-406n of the processor 400. The data cache 410 stores data operands used during execution of the instruction by the stages 406a-406n of the processor 400. The register set 412 stores data operands and other data used during execution of the instruction by the stages 406a-406n of the processor 400. In some embodiments, each of the threads 402a-402d in the processor 400 has a dedicated register set 412 and a dedicated instruction pointer into the instruction cache 408.

The address generation stage generates the address of the next instruction to be fetched from the instruction cache 408. The instruction fetch stage fetches an instruction for execution from the instruction cache 408 and stores the fetched instruction in an instruction buffer. The decode stage takes the instruction from the instruction buffer and decodes the instruction into a set of signals that can be directly used for executing subsequent pipeline stages. The read stage fetches required operands from the data cache 410 or from registers in the register set 412. The execution stage performs the actual program operation (such as add, multiply, or divide) using the fetched operands and generates a result. The write stage then writes the result generated by the execution stage back into the data cache 410 or the register set 412.

Assuming that each of the stages 406a-406n completes its operation in one clock cycle, an N-stage processor pipeline takes N clock cycles to process one instruction. As previously described, once the pipeline is full, an instruction can theoretically be completed every clock cycle.

In the illustrated example, each of the stages 406a-406n is shown as containing one of the instructions from one of the threads 402a-402d. This technique is used to identify the thread currently being executed by each of the processor stages 406a-406n. For example, the first stage 406a is currently executing an instruction from the first thread 402a, and the second stage 406b is currently executing an instruction from the fourth thread 402d.

The processor 400 or the concurrency engine 206 may be responsible for scheduling the execution of the threads 402a-402d by the stages 406a-406n of the processor. In other words, the processor 400 or the concurrency engine 206 determines which thread provides an instruction to the first stage 406a of the processor. If the scheduling of the threads 402a-402d is to be controlled by the processor 400, the processor 400 may include a scheduler 414. The scheduler 414 is responsible for scheduling the execution of instructions from the various threads 402a-402d. The scheduler 414 represents any suitable structure for scheduling the execution of instructions from the threads 402a-402d. For example, the scheduler 414 could represent hardware that identifies a priority for each thread and selects the next thread to be executed based on their priorities.

In FIG. 4A, the threads 402a-402d are interleaved on a cycle-by-cycle basis. This means that the processor 400 or the concurrency engine 206 selects a thread for execution during each clock cycle. This means that a different thread could be scheduled for execution each clock cycle. However, the same thread could be scheduled for more than one consecutive clock cycle, depending on the circumstances (such as the priority values of the threads).

Each time a stage in the processor 400 switches between two of the threads 402a-402d, a hardware or software context switch occurs. A context switch may cause a processor stage to write data for one thread to one register set 412 and read data for the next thread from another register set 412.

FIG. 4B illustrates a different interleaving technique for scheduling execution of the threads 402a-402d. In this example, instructions from only one of the threads 402a-402d are provided to the first stage 406a until an event that may cause latency occurs. For example, an instruction that requires a read from or write to external memory typically has an associated delay or latency. When an event causing latency is detected, a context switch is triggered, and instructions from another thread are provided to the first stage 406a. In this example, the third thread 402c was being executed by the processor 400 until an operation with latency was detected. At that point, a context switch occurred, and instructions from the first thread 402a began execution. While FIG. 4B illustrates a gap between execution of the third and first threads, the processor 400 could detect operations involving latency and perform context switches without requiring a gap in the execution of instructions.

In both examples shown in FIGS. 4A and 4B, the scheduler 414 in the processor 400 or the concurrency engine 206 needs to select a thread for execution (either each clock cycle or when latency is detected). The scheduler 414 or the concurrency engine 206 could use any suitable technique to select a thread for execution. For example, a round robin scheduling approach or a FIFO scheduling approach could be used.

The scheduler 414 or the concurrency engine 206 could also use a static priority scheme where each thread has an associated static priority. For example, each of the threads 402a-402d could have a register in its associated register set 412 that encodes the thread's execution priority. The scheduler 414 or the concurrency engine 206 could use these values to schedule execution of the threads. In particular embodiments, the thread with the highest priority is scheduled first. If multiple threads have the same priority, the threads with the highest priority are scheduled in a round-robin fashion. Threads with lower priorities are not executed if there are currently threads with higher priorities awaiting execution.

In addition, the scheduler 414 or the concurrency engine 206 could use a dynamic priority scheme where each thread has an associated dynamic priority. For example, if the network 108 is becoming congested, the scheduler 414 or the concurrency engine 206 could reduce the priority of threads that are generating large amounts of network traffic. The dynamic priority for each thread could be stored in that thread's register set 412. In some embodiments, the dynamic priority could change on a cycle-by-cycle basis, although other embodiments could be used.

As a particular example, a dynamically-calculated priority could be defined using the formula:

$$P_t = P_{t0} + K \cdot \frac{W_{td}}{D}, \quad (1)$$

where $P_t$ represents the dynamic priority for a particular thread, $P_{t0}$ represents a static component of the priority, K represents a constant, $W_{td}$ represents a dynamic measure of the work to be done for that thread, and D represents a measure of the amount of time from a deadline for the thread. The "dynamic measure of the work to be done" could represent an estimate of how many machine instructions are needed to complete the thread. For example, the estimated number of instructions for a thread could be stored in one register of the thread's register set 412, and the value in another register could be incremented each time an instruction from the thread is issued into the first stage 406a of the processor 400. The value of $W_{td}$ could be calculated as a difference between these values. The "measure of the amount of time from a deadline" may represent the number of clock cycles before the thread's deadline. For example, the value of a system clock when the thread must be completed could be stored in one register, and the value of D could be calculated as a difference between this value and the current value of the system clock.

In some embodiments, both the scheduler 414 and the concurrency engine 206 are responsible for scheduling execution of the threads 402a-402d. For example, the concurrency engine 206 may use information (such as a state machine) to improve or optimize one or more operating metrics of the processors 102a-102n. As particular examples, the concurrency engine 206 could improve or optimize power usage, real time response, or quality of service metrics of the processors 102a-102n. The concurrency engine 206 uses various inputs to perform this optimization. Example inputs include information identifying the number of threads active for each processor, a deadline for each thread, the estimated number of the instructions needed to complete each thread, the instructions executed by each thread, the priority (such as a statically allocated or dynamic priority) for each thread, a power consumption for each processor, and an amount of utilization of the network 108 for each processor. As a particular example, the scheduler 414 could use the following equation to calculate the dynamic priority for each thread:

$$P_t = P_{t0} + K \cdot \frac{W_{td}}{D} + Y_t, \quad (2)$$

where $Y_t$ is an additional term injected or controlled by the concurrency engine 206. The value of $Y_t$ could vary from thread to thread or could be held constant, depending on the circumstances. By using the $Y_t$ term in Equation (2), the concurrency engine 206 may adjust the priority of one or more of the threads 402a-402d in processors 102a-102n as needed. For example, the $Y_t$ term could be changed by the concurrency engine 206 to properly enforce concurrency semantics, such as temporary elevation of priority when ownership of a monitor is obtained in order to avoid priority inversion as described above. The concurrency engine 206 could also establish value(s) for $Y_t$ to increase or optimize system performance, such as to optimize power consumption or quality of service.

This represents one way that the concurrency engine 206 and the scheduler 414 could participate in jointly scheduling execution of the threads 402a-402d. Other techniques could also be used. For example, the scheduler 414 could use Equation (1) above to schedule execution of the threads, and the concurrency engine 206 could simply disable execution of particular threads or all threads on one or more processors as needed.

A dynamic priority mechanism may allow the processing system 100 to adapt at a very fine grain to unforeseen jitter and delays in executing the threads 402a-402d. Also, it may allow the threads 402a-402d to meet real-time deadlines. In addition, this may allow system designers to reduce system headroom to allow for jitter and unexpected overheads, which may help to reduce device costs and power consumption while increasing performance.

While Equations (1) and (2) have been described above as being used to schedule execution of threads 402a-402d in a processor 400, the concurrency engine 206 could use the same equation(s) to manage the wait queues of the concurrency objects. For example, if multiple threads are stalled and listed in a semaphore object's wait queue, the concurrency engine 206 could use Equation (1) above to select which thread resumes execution first.

Although FIGS. 4A and 4B illustrate two examples of scheduling in a multi-threaded processor 400, various changes may be made to FIGS. 4A and 4B. For example, the processor 400 could include any number of threads and any number of pipeline stages. In particular, the processor 400 could have only one thread, representing a conventional single-threaded processor. Also, the scheduling techniques could be used in any other suitable processor. In addition, the processor 400 could use any other scheduling technique.

Figure 5:
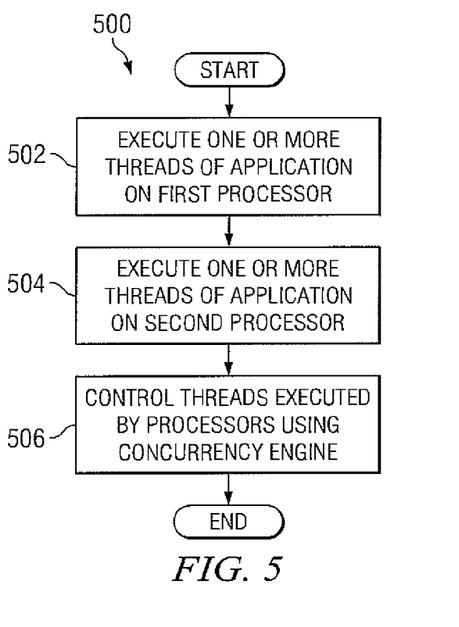
FIG. 5 illustrates an example method for accelerating multi-processing according to one embodiment of this disclosure.

FIG. 5 illustrates an example method 500 for accelerating multi-processing according to one embodiment of this disclosure. For ease of explanation, the method 500 is described with respect to the processor core 101 of FIG. 2 operating in the processing system 100 of FIG. 1. The method 500 could be used with any other suitable processor core and in any other suitable system.

One or more threads of an application are executed on a first processor at step 502. This may include, for example, providing portions of a software program to one of the processors 102a-102n for execution. The software program could represent any suitable multi-threaded program implementing any suitable functionality.

One or more threads of the application are executed on a second processor at step 504. This may include, for example, providing different portions of the software program to another of the processors 102a-102n for execution. The threads executed by the second processor potentially could execute in parallel with the threads executed by the first processor.

The execution of the threads by the first and second processors is controlled using a concurrency engine 206 at step 506. This may include, for example, the concurrency engine 206 stalling one of the threads being executed while another of the threads is being executed. In some embodiments, the concurrency engine 206 uses structures such as monitors, conditions, semaphores, queues, and counters to control the execution of the threads. The concurrency engine 206 also controls the suspension and resumption of the executing threads, such as by delaying read or write acknowledgements, using interrupts or exceptions, or directly accessing the logic of the processors 102a-102n such as by using the processor schedulers 414 to enable or disable processor execution or to increase or decrease power or clock speed.

Although FIG. 5 illustrates one example of a method 500 for accelerating multi-processing, various changes may be made to FIG. 5. For example, the various steps shown in FIG. 5 could be performed in parallel in the processing system 100.

Figure 6:
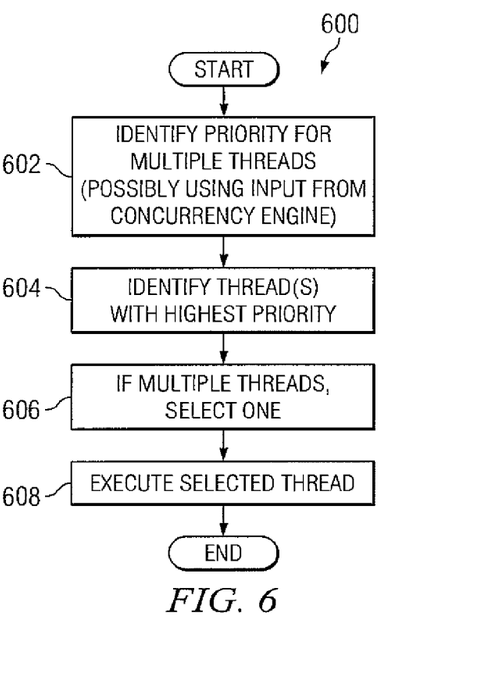
FIG. 6 illustrates an example method for thread scheduling in a multi-processing system according to one embodiment of this disclosure.

FIG. 6 illustrates an example method 600 for thread scheduling in a multi-processing system according to one embodiment of this disclosure. For ease of explanation, the method 600 is described with respect to the multi-threaded processor 400 of FIG. 4 operating in the processing system 100 of FIG. 1. The method 600 could be used with any other suitable processor and in any other suitable system.

The multi-threaded processor 400 identifies a priority for multiple threads at step 602. This may include, for example, the scheduler 414 accessing a register for each thread and identifying a static priority contained in each register. This may also include the scheduler 414 calculating a dynamic priority for each of the threads. The dynamic priority calculated by the scheduler 414 for each thread may or may not be based on input from the concurrency engine 206. The input from the concurrency engine 206 may cause one or more threads to have a higher priority or lower priority.

The multi-threaded processor 400 identifies the thread or threads with the highest priority at step 604. This may include, for example, the scheduler 414 comparing the numerical values of the priorities and selecting the thread(s) with the highest numerical priority value.

If there are multiple threads with the highest priority, the multi-threaded processor 400 selects one of the threads at step 606. This may include, for example, the scheduler 414 using a round robin technique to select one of multiple threads having the same priority.

The multi-threaded processor 400 executes the selected thread at step 608. This may include, for example, issuing an instruction from the selected thread to the first stage 406a of the processor 400.

Although FIG. 6 illustrates one example of a method 600 for thread scheduling in a multi-processing system, various changes may be made to FIG. 6. For example, the scheduler 414 could perform scheduling using a round robin technique or other technique that does not involve using priorities associated with the threads.

Figure 7:
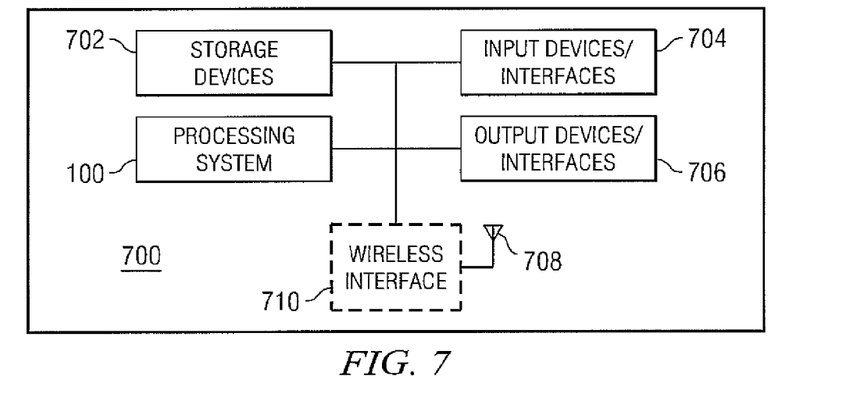
FIG. 7 illustrates an example apparatus using a processing system that accelerates multi-processing according to one embodiment of this disclosure.

FIG. 7 illustrates an example apparatus 700 using a processing system that accelerates multi-processing according to one embodiment of this disclosure. The apparatus 700 shown in FIG. 7 represents one operational environment in which the processing system 100 may be used. The processing system 100 may be used in any other suitable environment without departing from the scope of this disclosure.

As shown in FIG. 7, the processing system 100 is coupled to one or more storage devices 702, one or more input devices and/or input device interfaces 704, and one or more output devices and/or output device interfaces 706. The storage devices 702 represent any suitable mechanism or mechanisms for storing and facilitating retrieval of information. For example, the storage devices 702 could represent read only memories, random access memories, hard disk drives, CD drives, DVD drives, and any other or additional storage devices.

The input devices and/or interfaces 704 represent any suitable input device(s) and/or interface(s) to input devices. For example, the input devices/interfaces 704 could represent a keyboard, mouse, light pen, and/or other input device or interface to such a device.

The output devices and/or interfaces 706 represent any suitable output device(s) and/or interface(s) to output devices. For example, the output devices/interfaces 706 could represent a monitor, printer, scanner, and/or other output device or interface to such a device.

In this example, the apparatus 700 may be capable of transmitting and/or receiving wireless signals. To support this functionality, the apparatus 700 may optionally include an antenna 708 and wireless interface circuitry 710. The antenna 708 represents any suitable structure capable of transmitting and/or receiving wireless signals, such as a radio frequency ("RF") antenna. The wireless interface circuitry 710 represents any suitable circuitry capable of facilitating communication using wireless signals. For example, the wireless interface circuitry 710 could modulate data for transmission over RF signals and demodulate received RF signals to extract data for processing. The wireless interface circuitry 710 could, for example, represent an RF transceiver.

The apparatus 700 of FIG. 7 could represent any suitable device or system that is capable of using the processing system 100. For example, the apparatus 700 could represent a mobile telephone. In this example, the antenna 708 and wireless interface 710 are used to facilitate communication between the mobile telephone and a base station or other source of wireless signals. The input devices/interfaces 704 could represent a keypad on the mobile telephone and a microphone capable of captured audible sounds. The output devices/interfaces 706 could represent a display on the mobile telephone and a speaker capable of producing audible sounds. In addition, the storage devices 702 could represent memory and/or a smart card capable of storing information such as telephone numbers, a call log, and any other or additional information.

As another example, the apparatus 700 could represent a computing device, such as a networking device. In this example, the input devices/interfaces 704 and the output devices/interfaces 706 could represent ports that couple the apparatus 700 to one or more networks. The antenna 708 and wireless interface 710 could be omitted in this example. The apparatus 700 could implement any of a wide variety of functions, such as packet forwarding and traffic management in a network.

Although FIG. 7 illustrates one example of an apparatus 700 using a processing system that accelerates multi-processing, various changes may be made to FIG. 7. For example, the processing system 100 could be used in any other suitable device or system.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A processing system comprising:
   a plurality of processors configured to execute a plurality of threads and to support context switching; and
   a hardware concurrency engine coupled to the plurality of processors, the concurrency engine configured to manage a plurality of concurrency primitives that coordinate execution of the threads by the plurality of processors,
   wherein each of the plurality of concurrency primitives comprises a concurrency object used to support various coordination functions performed by the concurrency engine; and
   wherein the plurality of processors are configured to use the concurrency primitives by reading from and writing to addresses in an address space associated with the concurrency engine, wherein each address encodes an object index identifying one of the concurrency objects, an object type identifying a type associated with the identified concurrency object, and an operation type identifying a requested operation involving the identified concurrency object using bit variables.

2. The processing system of claim 1, wherein the plurality of concurrency primitives comprises at least one of: a semaphore, a queue, a counter, a timer, a monitor, a condition, a deferred condition, and a timeout condition.

3. The processing system of claim 1, wherein the plurality of processors are configured to use the concurrency primitives by at least using concurrency control instructions in an instruction set architecture of at least one of the plurality of processors.

4. The processing system of claim 1, wherein the concurrency engine comprises:
   a command decoder configured to decode requests from the plurality of processors;
   a request queue configured to store the decoded requests;
   a command processor configured to execute operations associated with the decoded requests, the operations involving at least some of the concurrency objects;
   a response queue configured to store results from the execution of the operations;
   a response formatter configured to encode the results;
   a message passing engine configured to receive the requests from the plurality of processors over a network and to communicate the results to the plurality of processors over the network; and
   a memory configured to store information associated with the threads, the concurrency objects, and queues corresponding to the concurrency objects.

5. The processing system of claim 1, wherein the concurrency engine is further configured to schedule execution of the threads by the plurality of processors.

6. The processing system of claim 5, wherein the concurrency engine is configured to schedule execution of the threads by at least one of:
   adjusting a thread priority for at least one of the threads;
   enabling and disabling execution of at least one of the threads;
   altering at least one of a power and a clock speed of at least one of the plurality of processors;
   gating a clock signal of at least one of the plurality of processors;

providing control signals to a thread scheduler in at least one of the plurality of processors;

providing control signals to load/store logic in at least one of the plurality of processors;

stalling at least one of a read acknowledgement and a write acknowledgement destined for at least one of the plurality of processors; and providing at least one of an interrupt and an exception to at least one of the plurality of processors.

7. The processing system of claim 6, wherein the concurrency engine is configured to enforce concurrency semantics when managing the concurrency primitives, the semantics associated with at least one of: mutual exclusion, monitors, waiting and signaling conditions, timeout conditions, deferred conditions, priority elevation to avoid priority inversion in the monitors, priority queues, and operation ordering.

8. The processing system of claim 1, wherein the concurrency engine is further configured to maintain thread descriptors for the threads, maintaining thread parent/child trees, and performing thread fork and thread join operations.

9. The processing system of claim 1, further comprising:
at least one memory;
at least one programmable hardware processing engine;
at least one interface to an external device; and
a network coupling the plurality of processors, the concurrency engine, the memory, the hardware processing engine, and the interface.

10. The processing system of claim 9, wherein the plurality of processors, the concurrency engine, the memory, the hardware processing engine, the interface, and the network comprise a system on a chip.

11. The processing system of claim 1, wherein the plurality of processors comprises homogenous processors in a symmetric multi-processing arrangement.

12. A method comprising:
executing a plurality of threads using a plurality of processors that support context switching;
managing a plurality of concurrency primitives that coordinate execution of the threads by the plurality of processors using a hardware concurrency engine coupled to the plurality of processors; and
reading from and writing, the plurality of processors, to addresses in an address space associated with the concurrency engine to use the concurrency primitives,
wherein each of the plurality of concurrency primitives comprises a concurrency object used to support various coordination functions performed by the concurrency engine; and
wherein each address encodes an object index identifying one of the concurrency objects, an object type identifying a type associated with the identified concurrency object, and an operation type identifying a requested operation involving the identified concurrency object using bit variables.

13. The method of claim 12, wherein the plurality of concurrency primitives comprises at least one of: a semaphore, a queue, a counter, a timer, a monitor, a condition, a deferred condition, and a timeout condition.

14. The method of claim 12, wherein managing the concurrency primitives comprises allowing the plurality of processors to use the concurrency primitives by at least using concurrency control instructions in an instruction set architecture of at least one of the plurality of processors.

15. The method of claim 14, wherein the concurrency engine comprises:
a command decoder configured to decode requests from the plurality of processors;
a request queue configured to store the decoded requests;
a command processor configured to execute operations associated with the decoded requests, the operations involving at least some of the concurrency objects;
a response queue configured to store results from the execution of the operations;
a response formatter configured to encode the results;
a message passing engine configured to receive the requests from the plurality of processors over a network and to communicate the results to the plurality of processors over the network; and
a memory configured to store information associated with the threads, the concurrency objects, and queues corresponding to the concurrency objects.

16. The method of claim 12, further comprising scheduling execution of the threads by the plurality of processors using the concurrency engine.

17. The method of claim 16, wherein scheduling execution of the threads comprises at least one of:
adjusting a thread priority for at least one of the threads;
enabling and disabling execution of at least one of the threads;
altering at least one of a power and a clock speed of at least one of the plurality of processors;
gating a clock signal of at least one of the plurality of processors;
providing control signals to a thread scheduler in at least one of the plurality of processors;
providing control signals to load/store logic in at least one of the plurality of processors;
stalling at least one of a read acknowledgement and a write acknowledgement destined for at least one of the plurality of processors; and
providing at least one of an interrupt and an exception to at least one of the plurality of processors.

18. The method of claim 12, further comprising maintaining thread descriptors for the threads, maintaining thread parent/child trees, and performing thread fork and thread join operations using the concurrency engine.

19. A hardware concurrency engine configured to manage a plurality of concurrency primitives that coordinate execution of threads by a plurality of processors, the concurrency engine comprising:
a command decoder configured to decode requests from the plurality of processors;
a command processor configured to execute operations associated with the decoded requests;
a response formatter configured to encode results from the execution of the operations; and
a memory configured to store information associated with a plurality of concurrency objects that represents the concurrency primitives and support various coordination functions performed by the concurrency engine, each operation executed by the command processor involving at least one of the concurrency objects, each request from the plurality of processors to use the concurrency primitives comprising at least one of a read operation and a write operation involving an address in an address space associated with the concurrency engine, the address encoding an object index identifying one of the concurrency objects, an object type identifying a type associated with the identified concurrency object, and an operation type identifying a requested operation involving the identified concurrency object using bit variables.

20. The concurrency engine of claim 19, further comprising:
a request queue Previously Presented configured to store the decoded requests before the decoded requests are provided to the command processor;

a response queue Previously Presented configured to store the results before the results are provided to the response formatter; and a message passing engine Previously Presented configured to receive the requests from the plurality of processors over a network and Previously Presented-to communicate the encoded results to the plurality of processors over the network.

21. The concurrency engine of claim 20, wherein the command decoder, the command processor, the response formatter, the request queue, the response queue, and the message passing engine comprise at least one of: an application-specific integrated circuit, a field programmable gate array, and a sea of gates.

22. An apparatus comprising:
at least one of: an input device and an interface to the input device, the input device configured to provide input data;
at least one of: an output device and an interface to the output device, the output device operable to receiving output data; and
a processing system configured to receive the input data and to generate the output data, the processing system comprising:
a plurality of processors configured to execute a plurality of threads; and
a hardware concurrency engine coupled to the plurality of processors, the concurrency engine configured to manage a plurality of concurrency primitives that coordinate execution of the threads by the plurality of processors,
wherein the concurrency engine comprises a memory configured to store information associated with a plurality of concurrency objects that represents the concurrency primitives and support various coordinating functions performed by the concurrency engine, each operation executed by the plurality of processors involving at least one of the concurrency objects, each request from the plurality of processors to use the concurrency primitives comprising at least one of a read operation and a write operation involving an address in an address space associated with the concurrency engine, the address encoding an object index identifying one of the concurrency objects, an object type identifying a type associated with the identified concurrency object, and an operation type identifying a requested operation involving the identified concurrency object using bit variables.

23. The apparatus of claim 22, wherein:
the apparatus comprises a mobile telephone;
the at least one of an input device and an interface to the input device comprises a keypad and a microphone; and
the at least one of an output device and an interface to the output device comprises a display and a speaker.

24. The apparatus of claim 22, further comprising:
an antenna configured to at least one of: receive wireless signals and transmit wireless signals; and
a wireless interface configured to convert received signals into data suitable for processing and to convert data into signals suitable for transmission.

25. The apparatus of claim 22, wherein:
the apparatus is coupled to a network; and
the processing system is configured to perform at least one of packet forwarding and traffic management.

26. The apparatus of claim 22, wherein the concurrency engine comprises:
a command decoder configured to decode requests from the plurality of processors;
a command processor configured to execute operations associated with the decoded requests; and
a response formatter configured to encode results from the execution of the operations.

27. A processor comprising:
an instruction set supporting a plurality of instructions for execution;
an embedded memory configured to store instructions to be executed, the instructions to be executed implementing at least one thread; and
a hardware concurrency engine configured to manage a plurality of concurrency primitives that coordinate execution of a plurality of threads by the processor and at least one additional processor,
wherein each of the plurality of concurrency primitives comprises a concurrency object used to support various coordination functions performed by the concurrency engine; and
wherein the processor is configured to use the concurrency primitives by reading from and writing to addresses in an address space associated with the concurrency engine, each address encoding an object index identifying one of the concurrency objects, an object type identifying a type associated with the identified concurrency object, and an operation type identifying a requested operation involving the identified concurrency object using bit variables.

28. The processor of claim 27, wherein:
the processor is configured to use the concurrency primitives by at least using concurrency control instructions in the instruction set of the processor.

* * * * *